(12) United States Patent
Scown et al.

(10) Patent No.: US 9,630,718 B2
(45) Date of Patent: Apr. 25, 2017

(54) VARIABLE OPENING OVERHEAD STOWAGE BINS AND RELATED METHODS

(71) Applicant: The Boeing Company, Huntington Beach, CA (US)

(72) Inventors: Stephen Lee Scown, Stanwood, WA (US); Paul Joseph Wilcynski, Seattle, WA (US); Jeffrey Scott Heaton, Bellvue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/616,377

(22) Filed: Feb. 6, 2015

(65) Prior Publication Data

US 2016/0229537 A1 Aug. 11, 2016

(51) Int. Cl.
  *B64D 11/00* (2006.01)
  *B64F 5/00* (2017.01)
  *B65D 90/54* (2006.01)

(52) U.S. Cl.
  CPC .............. *B64D 11/003* (2013.01); *B64F 5/00* (2013.01); *B65D 90/54* (2013.01)

(58) Field of Classification Search
  CPC .. B64D 11/003; B65D 43/164; B65D 43/163; B65D 43/16; B65D 43/20; B65D 90/54;
  (Continued)

(56) References Cited

U.S. PATENT DOCUMENTS

| | | |
|---|---|---|
| 4,275,942 A | 6/1981 | Steidl |
| 4,368,937 A | 1/1983 | Palombo et al. |

(Continued)

FOREIGN PATENT DOCUMENTS

| | | |
|---|---|---|
| EP | 0514957 | 11/1992 |
| EP | 2574550 | 4/2013 |
| WO | WO 2007/048915 | 5/2007 |

OTHER PUBLICATIONS

Wikipedia, "Systems Engineering", https://en.wikipedia.org/wiki/Systems_engineering; archived by Internet Archive on Jun. 8, 2013, http://web.archive.org/web/20130608152708/http://en.wikipedia.org/wiki/Systems_engineering; accesssed Jun. 17, 2016.*

(Continued)

*Primary Examiner* — Tien Dinh
*Assistant Examiner* — Alexander V Giczy
(74) *Attorney, Agent, or Firm* — DASCENZO Intellectual Property Law, P.C.

(57) ABSTRACT

An improved overhead storage system for use in an aircraft includes a variable opening overhead storage bin that is configured to automatically open to an initial open position when a latch mechanism is released, to open further to a second open position when a force is applied to the bin, and to return to the initial open position when the force is removed. The variable opening overhead storage bin includes a first stop device configured to stop the bin at the initial open position, and a second stop device configured to stop the bin at the second open position. When in the initial open position, the variable opening overhead storage bin is angled to retain stowed articles within the bin. When the variable opening overhead storage bin is further opened to the second open position, the passenger's hands are in a better position to control articles stowed within the bin.

20 Claims, 6 Drawing Sheets

(58) Field of Classification Search
CPC .... B60R 7/00; B60R 7/04; B60R 7/06; B60R 7/08; B60R 7/081; B60R 7/082; B60R 7/083; B60R 7/087; B60R 7/088; B60N 3/083; A24F 19/06; B64F 5/00
See application file for complete search history.

(56) References Cited

U.S. PATENT DOCUMENTS

| | | | |
|---|---|---|---|
| 5,244,269 A | 9/1993 | Harriehausen et al. | |
| 5,456,529 A * | 10/1995 | Cheung | B64D 11/003 244/118.5 |
| 5,567,028 A * | 10/1996 | Lutovsky | B64D 11/003 312/246 |
| 6,045,204 A * | 4/2000 | Frazier | B64D 11/003 16/370 |
| 6,062,509 A * | 5/2000 | Burrows | B64D 11/003 244/118.5 |
| 6,691,951 B2 * | 2/2004 | Frazier | B64D 11/003 244/118.1 |
| 6,874,731 B1 | 4/2005 | Brauer et al. | |
| 6,899,299 B2 * | 5/2005 | Ritts | B64D 11/003 244/118.5 |
| 7,128,295 B2 | 10/2006 | Scown | |
| 7,156,345 B2 | 1/2007 | Brauer et al. | |
| D608,721 S | 1/2010 | Wilcynski et al. | |
| D609,160 S | 2/2010 | Wilcynski et al. | |
| 8,011,618 B2 * | 9/2011 | Bock | B64D 11/003 244/118.1 |
| 8,136,897 B2 * | 3/2012 | Mascari | A47B 46/005 16/342 |
| 8,262,022 B2 | 9/2012 | Young et al. | |
| 8,480,029 B2 | 7/2013 | Young et al. | |
| 8,727,278 B2 | 5/2014 | Moritz | |
| 9,090,351 B1 * | 7/2015 | Frazier | B64D 11/003 |
| 2004/0245897 A1 * | 12/2004 | Stephan | B60R 5/003 312/246 |
| 2006/0132007 A1 | 6/2006 | Beckley | |
| 2012/0228426 A1 * | 9/2012 | Schneider | B64D 11/003 244/118.5 |
| 2013/0233971 A1 * | 9/2013 | Burrows | B64D 11/003 244/118.5 |
| 2014/0197721 A1 * | 7/2014 | Savian | B60Q 3/022 312/248 |
| 2014/0246968 A1 * | 9/2014 | Geng | B64D 11/003 312/319.2 |

OTHER PUBLICATIONS

FSF Editorial Staff, "Increased Amount and Types of Carry-on Baggage Bring New Industry Responses," Flight Safety Foundation, Cabin Crew Safety, vol. 32 No. 6, Nov.-Dec. 1997.

"Head Injury Risks from Overhead Luggage," The AirSafe Journal, Issue 13, Sep. 7, 1999 (revised Nov. 22, 2011), downloaded from www.airsafe.com/journal/issue13.htm on Nov. 14, 2014.

G. Simmons and L. Worden, "Advancements in Overhead Storage Bin Article Retention," Aero Magazine, No. 15, Jul. 2001, downloaded from www.boeing.com/commercial/aeromagazine/aero__15/ on Jan. 28, 2015.

M. Danko, "Airline's Liability for Injuries Caused by Falling Baggage," The Danko Law Firm—Aviation Law Monitor, Aug. 14, 2011, downloaded from www.aviationlawmonitor.com/2011/08/articles/claims-and-defenses/airlines-liability-for-injuries-caused-by-falling-baggage/ on Nov. 14, 2014.

"Overhead Bin Use, Warnings and Design Considerations," Exponent Engineering and Scientific Consulting, downloaded from www.exponent.com/Overhead-Bin-Use-Warnings-and-Design-Considerations/ on Nov. 14, 2014.

European Patent Office, Extended European Search Report for related European Patent Application No. 16153589, dated Jun. 30, 2016.

Machine-generated English translation of the abstract of WO 2007/048915, downloaded from espacenet.com on Sep. 13, 2016.

* cited by examiner

VARIABLE OPENING OVERHEAD STOWAGE BINS AND RELATED METHODS

FIELD

The present disclosure relates to variable opening overhead stowage bins and related methods.

BACKGROUND

Commercial aircraft typically include one of various forms of overhead storage bins (also referred to herein as "overhead stowage bins") so that passengers may stow carry-on luggage during the flight. While overhead storage bins may take a variety of forms, storage compartments with lowerable storage bins (which may be referred to as "pivot bins," "clamshell bins," or "drop-down bins") have been widely used on commercial aircraft and in other applications for a number of years. Such overhead storage bins are generally located along the sides of the aircraft and/or down the center of the aircraft, above the seats in the passenger compartment, and may be mounted within support structures on the sides and center of the aircraft's passenger compartment.

Pivot bins are generally mounted so that a passenger may grasp a handle located on the bin and release a latch mechanism, which in turn releases the storage bin downward, opening the bin. As a pivot bin opens, the storage bin pivots downward out of the overhead support structure, until it reaches its stop position. The lowered storage bin allows a passenger access to the interior of the storage bin. U.S. Patent Application Publication No. 2006/0132007 (Beckley) and U.S. Pat. No. 4,275,942 (Steidl), U.S. Pat. No. 4,368,937 (Palombo et al.), U.S. Pat. No. 5,244,269 (Harriehausen et al.), U.S. Pat. No. 7,128,295 (Scown), U.S. Pat. No. 8,262,022 (Young et al.), and U.S. Pat. No. 8,480,029 (Young et al.) all disclose various overhead storage compartments and related mechanisms that function as discussed above and are incorporated by reference herein for all purposes.

Pivot bins typically have a controlled rate of opening due to, for example, a rate control mechanism located on either end of the bin. The rate control mechanism also typically includes a stop that limits the extent to which the pivot bin may be lowered, thereby defining the stop position. Design criteria for pivot bins often focus on increasing stowage capacity and/or increasing article retention. Article retention devices have been developed to help prevent articles from falling out of overhead storage bins as they are opened, with most being developed for a different style of overhead storage bins: shelf bins. Unlike pivot bins, the shelf bin itself does not move, but instead, just the door opens upwards, exposing the interior of the shelf bin. Such article retention devices include secondary doors that remain closed when the outer door is opened, with visibility to see items inside the bin, nets, and deflector panels that prevent baggage from encroaching into the door cavity. While some of these article retention devices may have some utility with pivot bins, many of these article retention devices may not be compatible with pivot bins, may be expensive or complex, and/or may not be very effective with pivot bins.

SUMMARY

Keeping such design goals in mind, the present disclosure concerns improved overhead storage bins having a variable opening functionality, where, when a latch mechanism is released, the variable opening overhead storage bin may automatically open to an initial open position, and the variable opening overhead storage bin may be further opened to a second open position that may be obtained by pulling or pressing down on the bin once the bin reaches the initial open position. Such improved overhead storage bins may increase article retention, improve ergonomics, result in better passenger hand position when retrieving stowed articles, allow for a wider opening through which to stow or retrieve articles, and/or allow the storage bin to be openable to a lower height, thereby easing article retrieval. Methods of using such variable opening overhead storage bins and methods of installing variable opening overhead storage bins on an aircraft are also disclosed.

One example of a variable opening overhead storage bin according to the present disclosure includes a first panel and a cavity configured to receive a load, the variable opening overhead storage bin being movably coupled to an overhead support structure such that the variable opening overhead storage bin is selectively moveable from a closed position, in which a first edge of the first panel is positioned adjacent the overhead support structure, thereby closing the cavity off from the interior of the aircraft fuselage, to an initial open position in which the first edge of the first panel is spaced apart from the overhead support structure by a first distance and the cavity is open to the interior of the aircraft fuselage via an opening. The variable opening overhead storage bin is further selectively moveable from the initial open position to a second open position, wherein, in the second open position, the first edge of the first panel is spaced apart from the overhead support structure by a second distance, the second distance being greater than the first distance.

DESCRIPTION

Figure 1:
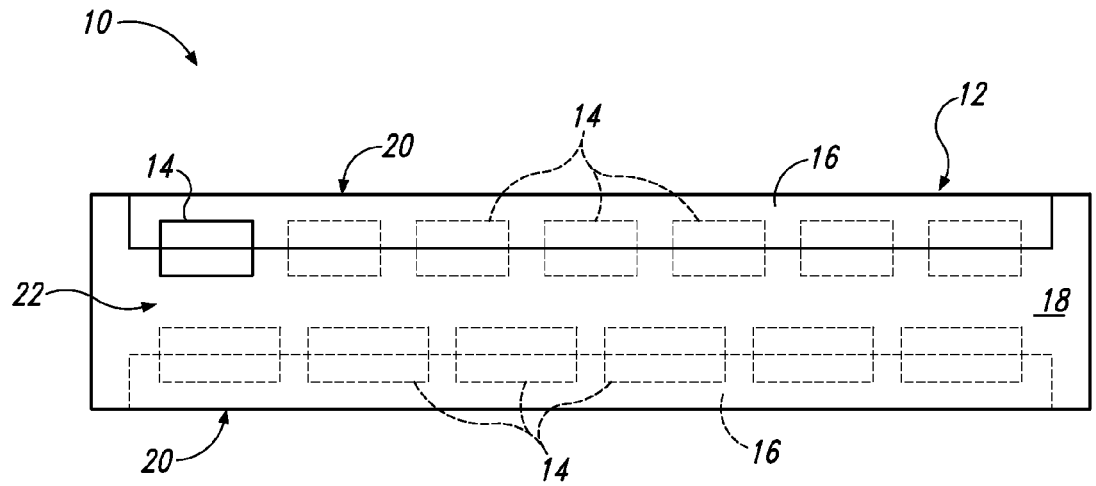
FIG. 1 is a schematic diagram representing an aircraft having a variable opening overhead storage system according to the present disclosure.
Figure 2:
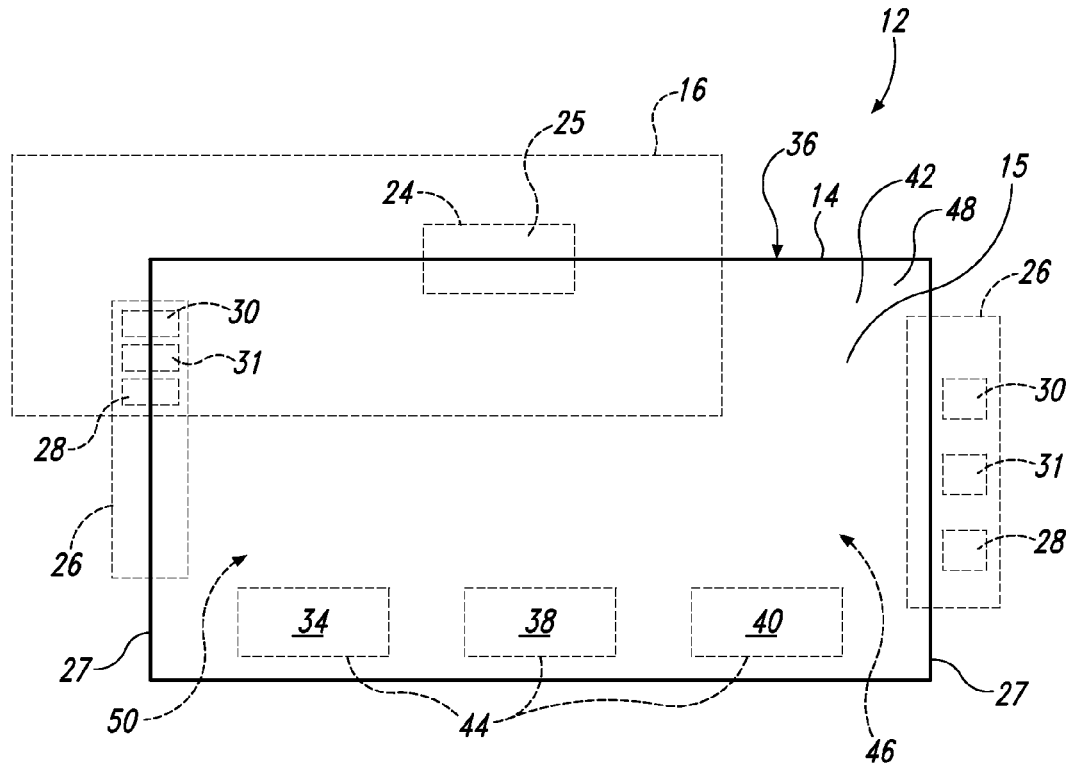
FIG. 2 is a schematic diagram representing examples of an overhead storage system including a variable opening overhead storage bin according to the present disclosure.

Improved overhead storage bins and methods of using the same to improve article retention on aircraft are disclosed herein. FIGS. 1-2 are schematic representations of non-exclusive examples of an aircraft 10 (FIG. 1) and an overhead storage system 12 including one or more variable opening overhead storage bins 14 according to the present disclosure (which also may be referred to herein as a pivot bin 14, a bin 14, a storage bin 14, and/or an overhead storage bin 14). Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

FIG. 1 shows an aircraft 10 having an overhead storage system 12 that may include a plurality of variable opening overhead storage bins 14 for passengers to stow articles during a flight. Generally, articles may be placed inside an overhead storage bin 14, the bin may be closed during the flight, and at the end of the flight, the bin may be opened, and the articles retrieved from within the bin. Bins 14 may be coupled to an overhead support structure 16 within a passenger compartment 18 of aircraft 10 (e.g., overhead support structure 16 may be coupled to an interior of an aircraft fuselage). As shown in FIG. 1, an overhead support structure 16 may be present along either or both sides 20 of passenger compartment 18, and/or may be present along a center portion 22 of passenger compartment 18. A plurality of storage bins 14 may be coupled to overhead support structure 16 such that the bins are configured to be selectively moveable with respect to overhead support structure 16. For example, as will be described in further detail below, in connection with FIGS. 2-8, storage bins 14 may be variable opening storage bins 14 that automatically pivot open to an initial open position when a latch mechanism is released, and may be further pivotable to a second open position by exerting a force on the bin 14. In this manner, presently disclosed variable opening overhead storage bins 14 may be configured to increase article retention (e.g. reduce incidents of articles accidentally falling out of the bins as they are opened), improve ergonomics, result in better passenger hand position to control stowed articles, allow for a wider opening through which to stow or retrieve articles, and/or allow the storage bin to be openable to a lower height, thereby easing article retrieval.

FIG. 2 schematically illustrates examples of an overhead storage system 12 that may include overhead support structure 16 and variable opening overhead storage bin 14 coupled thereto. Variable opening overhead storage bin 14 may include a body 15, a latch mechanism 24, one or more rate control devices 26 positioned at and/or coupled to one or both opposing side panels 27 of bin 14, and/or one or more article retention features 44.

As previously mentioned in regard to FIG. 1, overhead support structure 16 may be coupled to an interior of an aircraft fuselage, such as along sides 20 and/or center 22 of passenger compartment 18 of aircraft 10. Overhead support structure 16 may be any suitable structure that is configured to support one or more overhead storage bins 14. Overhead storage bins 14 may be moveable (e.g., pivotable) with respect to overhead support structure 16 such that, in a closed position, a first edge 36 of a first panel 42 of bin 14 is positioned adjacent overhead support structure 16, thereby closing off a cavity 46, the cavity being configured to receive a load (e.g., articles stowed by aircraft passengers, such as jackets, bags, suitcases, carry-ons, etc.). Variable opening overhead storage bin 14 may be pivotable through a range of open positions, as the bin is opened and first edge 36 is moved away from overhead support structure 16. Overhead support structure 16 may take any suitable form and may be configured to provide a framework to support one or more variable opening overhead storage bins 14. For example, overhead support structure 16 may provide an anchor point, securing the bins 14 within the aircraft fuselage. Overhead support structure 16 may be formed in an upper portion of the aircraft fuselage, thereby providing a framework for providing bins 14 in an "overhead" area of the fuselage (e.g., above passengers' heads when seated).

Variable opening overhead storage bin 14 may be any suitable three-dimensional shape, and may generally include opposing side panels 27 on either end of the bin, first panel 42, and/or an upper panel 48, which may be arranged with respect to one another to form an opening 50 and define cavity 46 inside bin 14. In other examples, variable opening overhead storage bin 14 may not include side panels 27 and/or upper panel 48, with cavity 46 being defined by first panel 42 and overhead support structure 16 (e.g., first panel 42 may be arranged with respect to overhead support structure 16 such that overhead support structure 16 forms the sides and/or top of cavity 46). Cavity 46 may be configured to receive a load, such as one or more articles stowed by passengers during a flight. Cavity 46 may be sized to be large enough to receive one or more standard-sized pieces of carry-on luggage and/or one or more other articles. Storage bin 14 and overhead support structure 16 may be strong enough to support the weight of one or more articles stowed in cavity 46. For example, each storage bin 14 and overhead support structure 16 may be strong enough to support a load of at least 10 pounds, at least 20 pounds, at least 30 pounds, at least 40 pounds, at least 50 pounds, at least 75 pounds, at least 100 pounds, at least 150 pounds, at least 200 pounds, and/or greater than 200 pounds. Storage bin 14 may be formed of any suitable materials, with side panels 27, first panel 42, and/or upper panel 48 often being formed of a composite or metallic honeycomb structure surrounded on either side by a laminate or other surface layer.

Storage bin 14 may include latch mechanism 24 that may be configured to retain storage bin 14 in a closed position (e.g., with first edge 36 positioned adjacent overhead support structure 16 and cavity 46 being inaccessible from the passenger compartment of the aircraft) when latch mechanism 24 is engaged, such as with overhead support structure 16. In some examples, when storage bin 14 is in the closed position, overhead support structure 16 may be configured to block opening 50, such that cavity 46 is concealed and closed off. In some examples, only first panel 42 of storage bin 14 may be visible within the passenger compartment when the bin is in the closed position. When latch mechanism 24 is released, such as by pulling or pressing on a handle 25 of latch mechanism 24, storage bin 14 may be configured to automatically open to an initial open position where first edge 36 is spaced apart from overhead support structure 16 and cavity 46 is accessible from the passenger compartment of the aircraft (e.g., opening 50 to bin 14 may face outward towards the passenger compartment when bin 14 is not in the closed position).

One or more rate control devices 26 may be coupled to overhead storage bin 14 (e.g., to side panels 27) and/or to overhead support structure 16. Rate control devices 26 may be configured to control the rate of descent of storage bin 14 as it pivots open away from overhead support structure 16, towards the initial open position from the closed position (e.g., upon release of latch mechanism 24 and/or when a user operates handle 25 to open the bin). As overhead storage bin 14 moves, it may pivot through a range of pivot positions, opening further until it reaches the initial open position. Rate control devices 26 may be configured to limit the speed at which bin 14 pivots, such that the bin does not open too quickly. Additionally or alternatively, rate control devices 26 may include a first stop device 30 that may be configured to stop bin 14 at the initial open position. For example, first stop device 30 may include a pin, stop block, and/or any other device or mechanism designed to limit movement of bin 14 and bring it to rest at the initial open position such that when latch mechanism 24 is released (e.g., when handle 25 is operated), the bin may open automatically at a rate controlled by rate control device 26 and automatically come to a stop at the initial open position. For example, first stop device 30 may be coupled to bin 14 and rotate along with bin 14 as it is opened and closed. Once bin 14 is opened sufficiently, first stop device 30 may engage with and/or contact another component or portion of rate control device 26, thereby stopping bin 14.

In some examples, rate control devices 26 may be configured to control the lowering of pivot bin 14 at two or more different rates at various points of lowering. For example, rate control devices 26 may be configured to control the rate of movement of pivot bin 14 at a first rate as the bin is opened from the closed position towards the initial open position, but may be configured to reduce the rate of movement of pivot bin 14 to a second rate (wherein the second rate is slower than the first rate) once pivot bin 14 has pivoted through a threshold position. For example, rate control devices 26 may be configured to slow the rate of movement of pivot bin 14 once it reaches a predetermined threshold position, such as a level position (e.g., where first panel 42 is substantially parallel to the floor of the passenger compartment of the aircraft), such that as pivot bin 14 moves from the level position to the initial open position, it does so at a slower rate than it did while opening from the closed position to the level position. Such rate control devices 26 may be configured to further slow pivot bin 14 between the level position (or other set threshold position) and the initial open position without further input from a user. For example, once latch mechanism 24 is released (or pivot bin 14 is otherwise caused to open from the closed position), rate control devices 26 may be configured to automatically allow the bin to open at a first rate from the closed position to the threshold position (e.g., the bin position where first panel 42 is approximately level to the floor) and then slow the bin to a slower second rate as it moves from the threshold position to rest at the initial open position. Rate control devices 26 may be configured to slow or control the rate of opening, or rate of movement, of pivot bin 14, to at least partially counteract the pull of gravity on bin 14 and any load therein, thereby slowing the rate of descent of pivot bin 14 as compared to the speed at which pivot bin 14 would open without the presence of said rate control devices 26.

Rate control device 26 may include any device or mechanism that may be configured to control the rate of movement of overhead storage bin 14 (e.g., to slow it down from the pull of gravity as it opens downward). For example, rate control device 26 may include one or more springs 28, such as a gas spring. In some examples, rate control device 26 may include a shock absorber (e.g., an oil-filled shock absorber), a snubber, and/or any damping device that may be configured to control or slow the rate at which overhead storage bin 14 opens once latch mechanism 24 is released (or pivot bin 14 is otherwise caused to open). In some examples, existing conventional rate control devices may be modified and/or repurposed to operate with variable opening overhead storage bins 14 according to the present disclosure.

Overhead storage bin 14 may be further pivotable beyond the initial open position to a second open position upon application of a force to the bin when in the initial open position. In some examples, overhead storage bin 14 may include a second stop device 31 that stops overhead storage bin 14 at a second open position. In some examples, in order to move overhead storage bin 14 from the initial open position (e.g., where bin 14 is stopped by first stop device 30) to the second open position (e.g., where bin 14 is stopped by second stop device 31), a force must be exerted on the bin. For example, once pivot bin 14 has come to rest in the initial open position, a passenger or crew member may press down on bin 14 or pull down on bin 14, such as by pressing or pulling on first edge 36 and/or first panel 42 of bin 14 and/or handle 25, in order to move bin 14 through a second range of pivot positions towards the second open position (e.g., further away from the closed position). The amount of force required to move bin 14 from the initial open position to the second open position may be different depending on the particular implementation of bin 14, and/or depending on the weight of any load inside bin 14. In this manner, overhead storage bin 14 may have a variable opening functionality, where the bin may open automatically to the initial open position when latch mechanism 24 is released (such as by pulling handle 25), and where the bin may be further opened to the second open position by exerting a force on the bin. The variable opening functionality of presently disclosed overhead storage bins 14 may improve article retention in the bins, improve ergonomics, and/or improve a user's hand position for retrieving a load stored in variable opening overhead storage bin 14.

Overhead storage bin 14 may include one or more article retention features 44, such as a longitudinally extending groove 34, a wedge 38, and/or a door deflector 40. One or more grooves 34 may be formed within cavity 46, such as near first edge 36 of first panel 42. Grooves 34 may be longitudinally extending along the length of first edge 36, and may extend substantially along the entire length of first edge 36. Groove 34 may be a recess or divot formed in the inner surface of first panel 42, facing cavity 46, and may be sized to receive a portion of a load stored within cavity 46, which may increase article retention of the load. For example, a corner of a load stored within cavity 46 may fit within groove 34, which may help to prevent the load from sliding out as overhead storage bin 14 is opened, thereby improving article retention.

Additionally or alternatively, overhead storage bin 14 may include one or more wedges 38 positioned within cavity 46. In some examples wedge 38 may be positioned on the inner surface of first panel 42, facing cavity 46, and opposite first edge 36 (e.g., farther inside cavity 46). Wedge 38 may be configured to receive at least a portion of one of more wheels of a load, such as a wheeled bag or suitcase. In some examples, wedge 38 may be configured to reduce the chances of the wheels rolling, so as to increase article retention within overhead storage bin 14. Overhead storage bin 14 may include one or more door deflectors 40 that may be configured to prevent a load stored within cavity 46 from being lodged partially within first panel 42. For example, door deflector 40 may be a three dimensional object that is secured to the inner surface of first panel 42, and may be sized and positioned to prevent a load from encroaching on first panel 42, which may also increase article retention within overhead storage bin 14.

Turning now to FIGS. 3-8, illustrative non-exclusive examples of variable opening overhead storage bins 14 are illustrated. Where appropriate, the reference numerals from the schematic illustrations of FIGS. 1-2 are used to designate corresponding parts of the examples of FIGS. 3-8; however, the examples of FIGS. 3-8 are non-exclusive and do not limit overhead storage bins to the illustrated embodiments of FIGS. 3-8. That is, variable opening overhead storage bins are not limited to the specific embodiments of FIGS. 3-8, and may incorporate any number of the various aspects, configurations, characteristics, properties, etc. that are illustrated in and discussed with reference to the schematic representations of FIGS. 1-2 and/or the embodiments of FIGS. 3-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 3-8; however, it is within the scope of the present disclosure that the previously discussed features, variants, etc. may be utilized with any of the examples of FIGS. 3-8.

Figure 3:
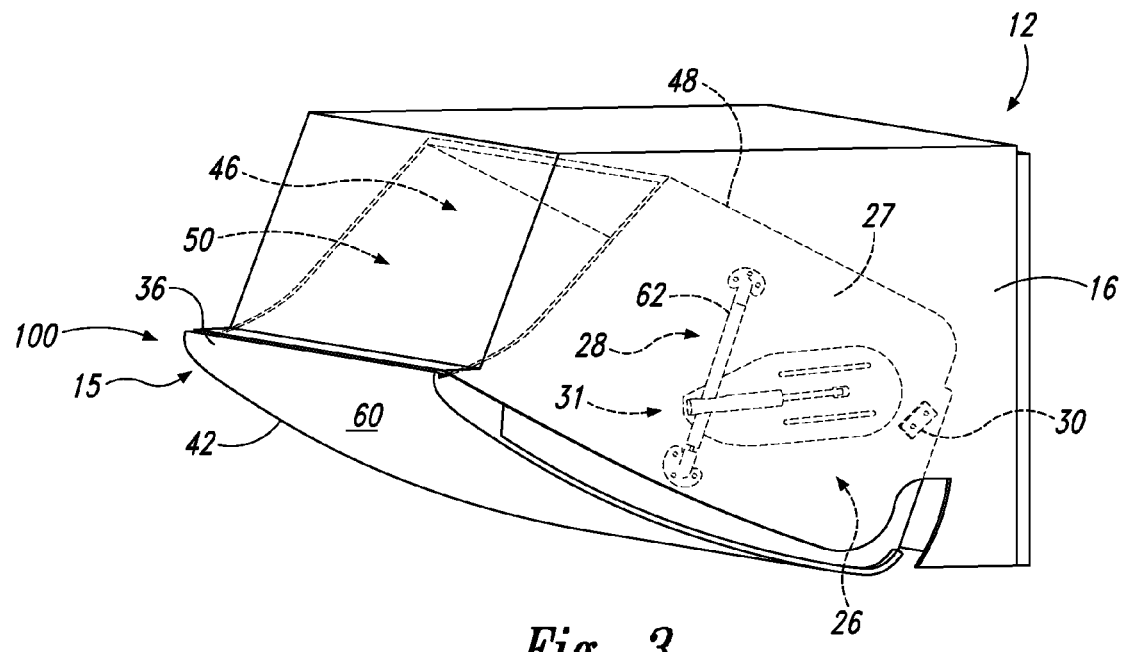
FIG. 3 is a perspective view of an overhead storage bin according to the present disclosure, illustrating the overhead storage bin in a closed position.

As seen in FIGS. 3-6, an overhead storage system 12 may include an overhead support structure 16 and a variable opening overhead storage bin 100, which is an example of overhead storage bin 14. Overhead support structure 16 may be coupled to an interior of an aircraft fuselage, and may be configured to support a plurality of overhead storage bins 100. In FIG. 3, overhead storage bin 100 is shown in a closed position and may include first panel 42 and cavity 46, which may be configured to receive a load, such a passenger's carry-on suitcase or other article. In the closed position of FIG. 3, first edge 36 (which may be an outer edge 36) of first panel 42 may be positioned adjacent overhead support structure 16, such that cavity 46 is closed off from the interior of the aircraft fuselage (e.g., in the closed position of FIG. 3, overhead support structure 16 at least partially blocks, or conceals, opening 50 to cavity 46, thereby preventing access to the interior portion of overhead storage bin 100).

Figure 4:
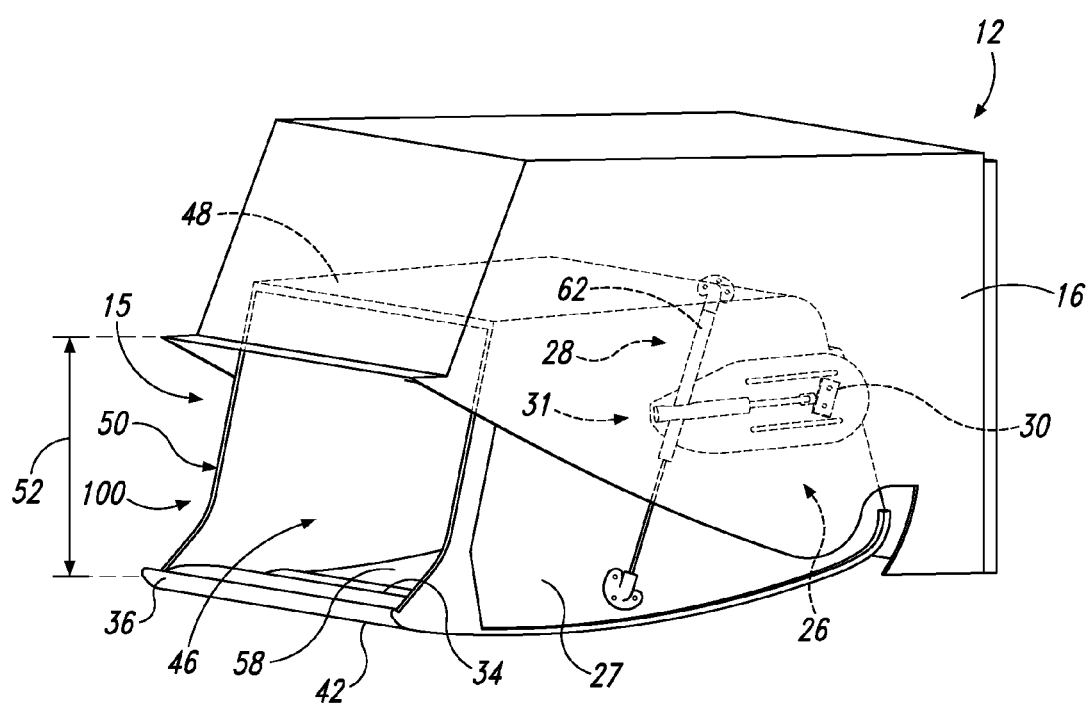
FIG. 4 is a perspective view of the overhead storage bin of FIG. 3, illustrating the overhead storage bin in an initial open position.
Figure 5:
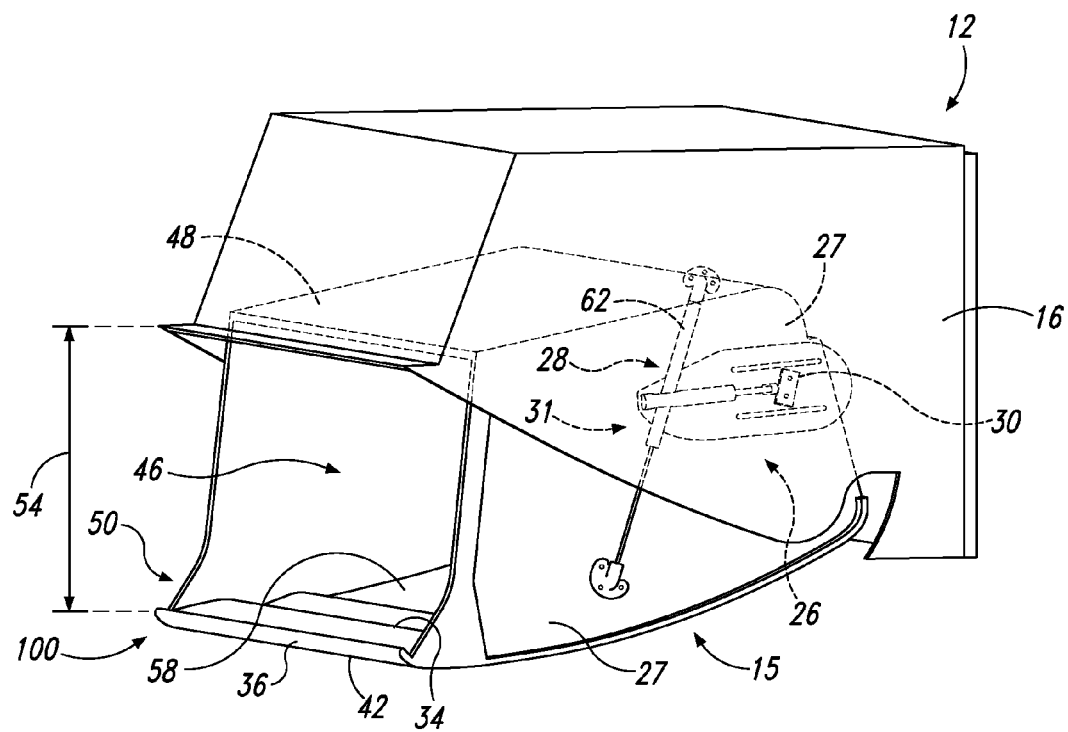
FIG. 5 is a perspective view of the overhead storage bin of FIGS. 3-4, illustrating the overhead storage bin in a second open position.
Figure 6:
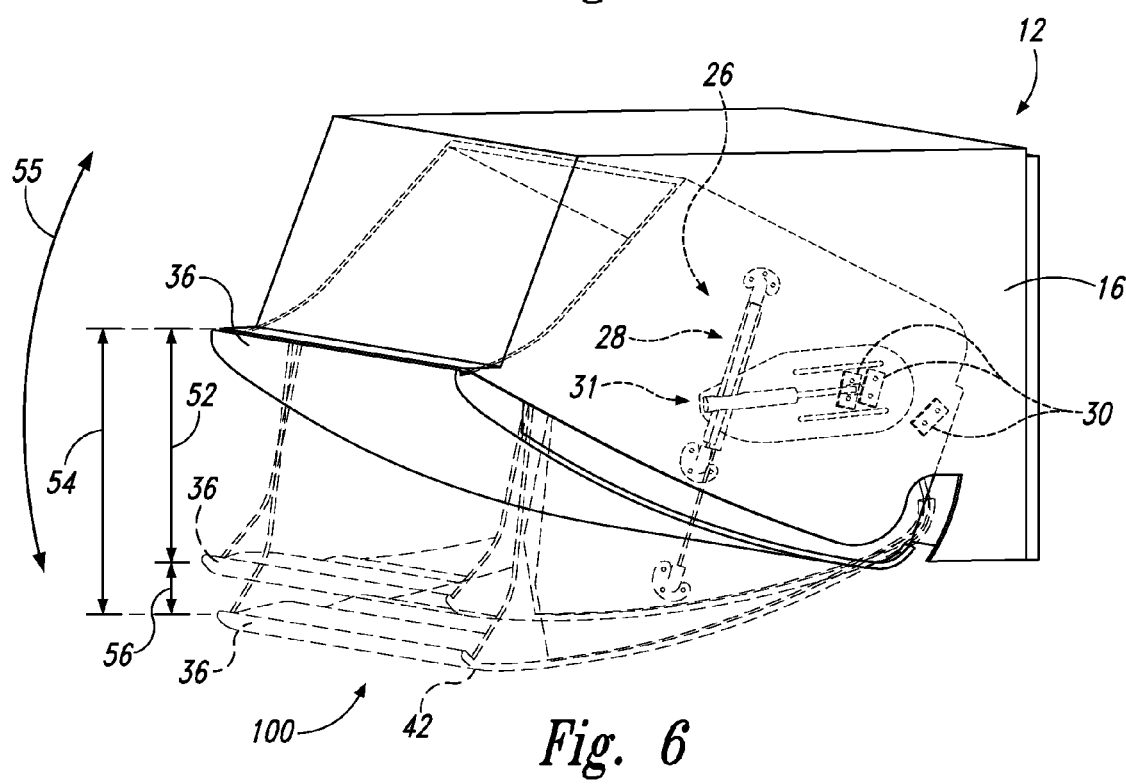
FIG. 6 is a is a perspective view of the overhead storage bin of FIGS. 3-5, illustrating the closed position, initial open position, and second open position.

Overhead storage bin 100 may be movably coupled to overhead support structure 16 such that the bin (e.g., body 15 of overhead storage bin 100) is selectively moveable (e.g., selectively pivotable, or selectively caused to pivot) with respect to overhead support structure 16. For example, overhead storage bin 100 may be selectively moveable or selectively pivotable (e.g., selectively caused to pivot) from the closed position of FIG. 3 to an initial open position, as shown in FIG. 4, such as by selectively opening the bin 100 (e.g., by selectively releasing a latch mechanism or otherwise selectively causing bin 100 to open). In the initial open position, first edge 36 may be spaced apart from overhead support structure 16 by a first distance 52. In the initial open position of FIG. 4, cavity 46 may be open and accessible to the interior of the aircraft fuselage (e.g., to passenger compartment 18 of aircraft 10) via opening 50. As illustrated in FIG. 5, overhead storage bin 100 may be further selectively moveable away from overhead support structure 16, from the initial open position of FIG. 4 to or towards a second open position, where first edge 36 is spaced apart from overhead support structure 16 by a second distance 54, second distance 54 being greater than first distance 52. A greater portion of opening 50 may be accessible in the second open position than in the initial open position, which may allow easier access to cavity 46. FIG. 6 illustrates movement of overhead storage bin 100, showing all three positions, with the bin being selectively pivotable (e.g., selectively caused to pivot) through a range of movement defined by a range of pivot positions between the illustrated closed position, initial open position, and second open position, such as by being pivoted in the directions indicated by arrow 55. In some examples, overhead storage bin 100 (e.g., first edge 36 of overhead storage bin 100) may be configured to be moved substantially vertically away from overhead support structure 16 when selectively moved from the initial open position (FIGS. 4 and 6) to or towards the second open position (FIGS. 5 and 6). As seen in FIG. 6, first edge 36 may be moved a third distance 56 as it is moved from the initial open position to or towards the second open position. Third distance 56 may be equal to the difference between second distance 54 and first distance 52, representing movement of overhead storage bin 14 between the initial open position and the second open position. The difference between second distance 54 and first distance 52 (e.g., third distance 56) may be at least 1 inch (2.5 cm), at least 2 inches (5 cm), at least 3 inches (7.5 cm), at least 4 inches (10 cm), and/or at least 5 inches (12.5 cm).

Cavity 46 may be defined by a body 15 configured to receive a load via opening 50. Body 15 may be formed by first panel 42, opposing side panels 27, and an upper panel 48 of overhead storage bin 100. An inner surface 58 of first panel 42 may be configured to face cavity 46, and an outer surface 60 of first panel 42 may be configured to face the interior of the aircraft fuselage. In some examples, inner surface 58 may include one or more article retention features 44, such as groove 34, which may be a longitudinally extending groove adjacent first edge 36. Groove 34 may be configured to increase article retention in overhead storage bin 100, such as by serving as a recess to receive a portion of a load stored within cavity 46, thereby decreasing chances that the load will fall out of bin 100.

Overhead storage bin 100 may be configured to automatically stop at the initial open position (FIG. 4) when it is opened from the closed position (FIG. 3). In order to selectively move bin 100 from the initial open position to or towards the second open position (FIG. 5), application of a force to overhead storage bin 100 may be required (e.g., exertion of a force on bin 100 may be required to selectively cause the bin to pivot from the initial open position to or towards the second open position). For example, a first stop device 30 may be coupled to bin 100 and/or overhead support structure 16, and may stop bin 100 at the initial open position. In some examples, application of a force (such as a downward pushing or pulling force) to overhead storage bin 100 (e.g., to first edge 36 and/or first panel 42) may be required to move bin 100 beyond the initial open position towards the second open position. For example, first stop device 30 may be coupled to body 15 of bin 14 and may rotate along with bin 14 as it is opened towards the initial open position. Once first stop device 30 contacts rate control device 26, as shown in FIG. 4, bin 14 may reach the initial open position. Application of a force on bin 14 may compress a spring within rate control device 26 (e.g., first stop device 30 may be configured to compress a spring as the bin is further opened), thereby allowing bin 14 to be further opened to the second open position. Other configurations and mechanisms are also within the scope of this disclosure.

Overhead storage bin 100 may include a second stop device 31 that is coupled to bin 100 and/or overhead support structure 16, where second stop device 31 may be configured to stop bin 100 at the second open position, thereby preventing further movement away from overhead support structure 16 (e.g., damage may be caused to the overhead storage bin 100 if it is moved further open beyond the second open position and in a direction away from the closed position). Bin 100 may be selectively moveable (or selectively caused to move) back and forth between the closed position, the initial open position, and the second open position, and through ranges of pivot positions between these positions. Overhead storage bin 100 may be configured to require varying amounts of force to selectively move the bin from the initial open position to or towards the second open position. For example, application of a force of at least 10 pounds, at least 20 pounds, at least 30 pounds, at least 40 pounds, at least 50 pounds, and/or at least 60 pounds may be required to enable movement of the overhead storage bin from the initial open position to or towards the second open position. In examples where bin 100 includes a load within cavity 46, the required force may be lowered by the weight of the load, such that opening a loaded bin to or towards the second open position may require less force than opening an empty bin to or towards the second open position. In some examples, the same component may serve as both first stop device 30 and second stop device 31. For example, first stop device 30 may be configured to stop bin 14 in the initial open position and in the second open position.

Overhead storage bin 100 may include one or more rate control devices 26 coupled to the bin and/or to overhead support structure 16, such as to one or both side panels 27 of bin 100. Rate control device 26 may be configured to control the rate of lowering or opening when overhead storage bin 100 is selectively moved from the closed position to the initial open position, such that the bin does not open too quickly as it automatically opens to and stops at the initial open position when, for example, latch mechanism 24 is released. Rate control devices 26 may be configured to open overhead storage bin 100 at one or more rates, and/or through a range of rates. For example, rate control devices 26 may be configured to open overhead storage bin 100 at a first rate for a first portion of the range of movement of overhead storage bin 100 and at a second rate for a second portion of the range of movement of overhead storage bin 100, where the second rate is slower than the first rate, and where both the first rate and the second rate are slower than a gravitational rate that overhead storage bin would move at in the absence of rate control devices 26. In some examples, the range of movement of overhead storage bin may be such that overhead storage bin passes through a level position where first panel 42 is approximately horizontal (e.g., level with the floor of the passenger compartment) as it moves from the closed position to the initial open position. In such examples, rate control devices 26 may be configured to allow overhead storage bin to open at the first rate between the closed position and the level position (e.g., rate control devices 26 may be configured to slow the rate of movement of overhead storage bin 100 to the first rate through a first range of positions as overhead storage bin is selectively caused to pivot from the closed position towards the initial open position), and to further slow overhead storage bin 100 to the second rate as it approaches the initial open position from the level position.

Rate control device 26 may include one or more of a shock absorbing device, a snubber, a spring (e.g., a gas spring), and/or a damping device. For example, rate control device 26 may include a snubber 62 configured to control the rate of lowering when overhead storage bin 100 is lowered from the closed position to the initial open position, snubber 62 being configured to retain overhead storage bin 100 in the initial open position in the absence of an external force exerted on the bin (e.g., rate control device 26 and/or snubber 62 may include and/or may serve as first stop device 30). Snubber 62 also may include a spring 28 configured to allow selective movement of overhead storage bin 100 from the initial open position to or towards the second open position in the presence of an external force exerted on the bin, such as a downward force exerted on first panel 42 of overhead storage bin 100. Spring 28 may be configured to at least partially determine the amount of force required to selectively move overhead storage bin 100 from the initial open position to or towards the second open position (e.g., the force required to compress or extend the spring may correspond to the force required to open bin 14 to the second open position). Additionally or alternatively, spring 28 may include and/or may be configured to serve as a second stop device 31, such that the limit of extension or compression of spring 28 may determine the range of movement between the initial open position and the second open position, and therefore may determine the extent to which bin 100 may be opened beyond the initial open position.

Spring 28 (or other rate control device 26) may be configured to bias body 15 to the initial open position. For example, when the exerted force is removed from bin 100 while bin 100 is in the second open position (or in an intermediate position within the second range of pivot positions between the initial open position and the second open position), spring 28 (or other rate control device 26) may cause bin 100 to move back to the initial open position. In some examples, spring 28 may be positioned near the end of the stroke of snubber 62. In this manner, overhead storage bin 100 may be configured to be selectively moveable through a range of pivot positions by pivoting overhead storage bin 100 from the closed position to the initial open position, and selectively moveable through a second range of pivot positions by further pivoting overhead storage bin 100 from the initial open position to or towards the second open position, in a direction away from the closed position. The examples of rate control devices 26, first stop devices 30, and second stop devices 31 are not intended to be limiting, and any devices or mechanisms may be used in connection with an overhead storage bin 100 that may give the described variable opening functionality, where the bin automatically pivots open and stops at an initial open position when the bin is opened (e.g., when latch mechanism 24 is released), and where the bin may be opened further to or towards a second open position when a force is applied to the bin.

Figure 7:
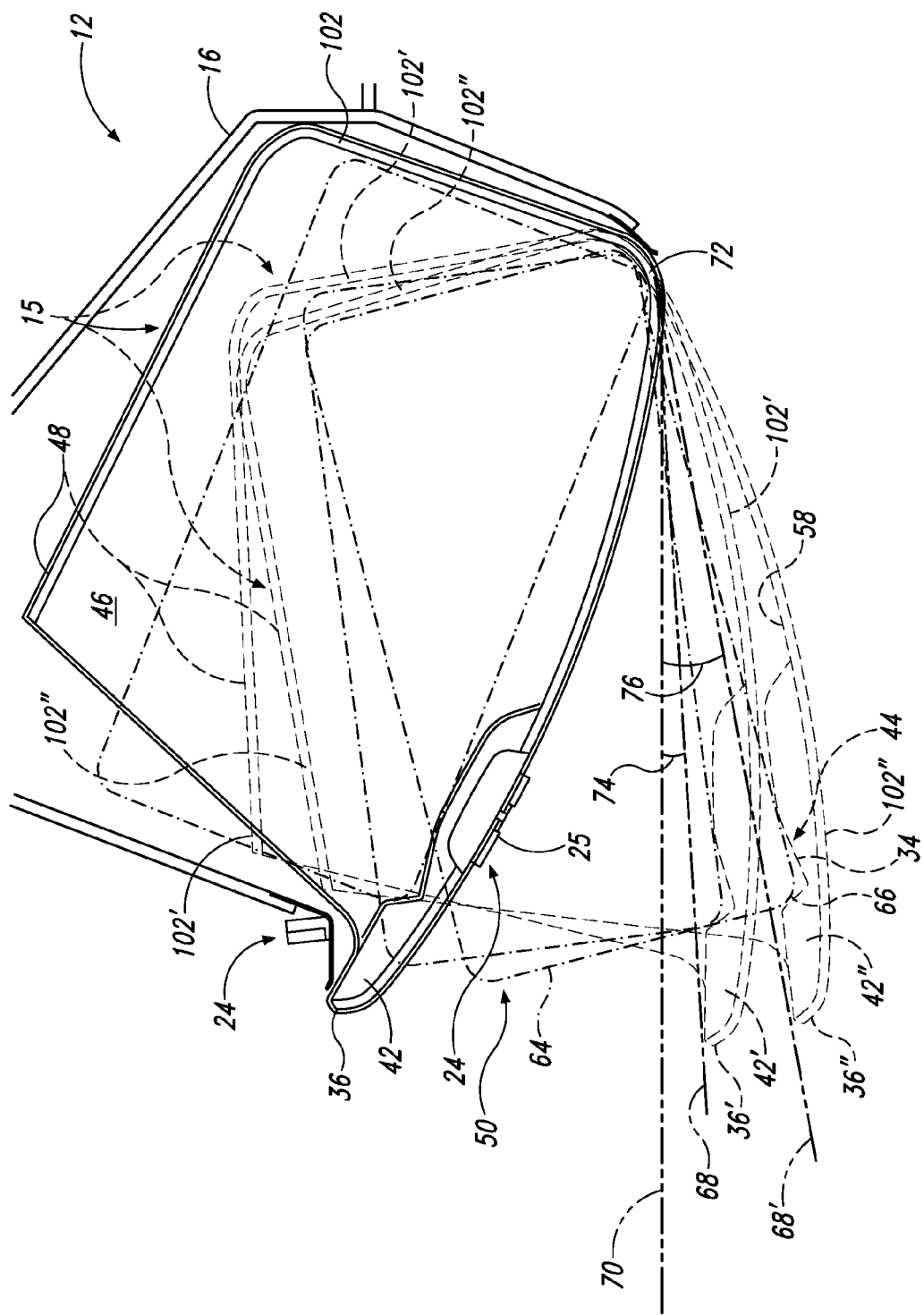
FIG. 7 is a side view of an example of a variable opening overhead storage bin according to the present disclosure, showing the closed position, initial open position, and second open position.

FIG. 7 shows another example of an overhead storage system 12 that may include an overhead support structure 16 and a variable opening overhead storage bin 102, which is an example of overhead storage bin 14. FIG. 7 shows overhead storage bin 102 in three positions: a closed position (102) where first edge 36 of first panel 42 is positioned adjacent overhead support structure 16, an initial open position (overhead storage bin 102') wherein first edge 36' is spaced apart from overhead support structure 16, and a second open position (overhead storage bin 102") wherein first edge 36" is spaced further apart from overhead support structure 16 than is first edge 36' in the initial open position.

As shown in FIG. 7, cavity 46 may include a load 64 placed therein, wherein load 64 may be contained within cavity 46 in any of the three positions of overhead storage bin 102, 102', 102" (or a position therebetween). For example, load 64 may be placed within cavity 46 when bin 102' is in the initial open position, stored in bin 102 in the closed position, and retrieved (e.g., removed from) bin 102" in the second open position. One or more article retention features 44, such as groove 34, may be formed on or in bin 102. For example, inner surface 58 of first panel 42 may include a longitudinally extending groove 34 that is configured to receive a portion of load 64, such as a corner 66 of load 64. In this manner, corner 66 may catch in groove 34, which may decrease chances of load 64 sliding out of bin 102 as bin 102 is opened.

Overhead storage bin 102 may include latch mechanism 24 configured to retain overhead storage bin 102 in the closed position while overhead storage bin 102 is not being operated (e.g., while latch mechanism 24 is engaged). Latch mechanism 24 may include one or more components coupled to overhead storage bin 102 and/or overhead support structure 16. Latch mechanism 24 may be configured such that releasing latch mechanism 24 causes overhead storage bin 102 to open to the initial open position (e.g., releasing latch mechanism 24 may be configured to release body 15 of overhead storage bin 102 from overhead support structure 16). For example, latch mechanism 24 may include handle portion 25 that is accessible from the interior of the aircraft fuselage when overhead storage bin 102 is in the closed position. Handle portion 25 may be positioned on first panel 42 of overhead storage bin 102.

As shown in FIG. 7, body 15 of overhead storage bin 102 may be selectively pivotable through a range of pivot positions between the closed position and the initial open position (e.g., selectively caused to pivot from the closed position to the open position, such as by operating handle 25 and/or releasing latch mechanism 24), and may be selectively pivotable through a second range of pivot positions between the initial open position and the second open position (e.g., selectively caused to pivot to or towards the second open position, such as by applying a force to overhead storage bin 102). The range of motion of overhead storage bin 102 may be described by a plurality of angles through which overhead storage bin 102, 102', or 102" moves. For example, an angle representing the degree of pivoting of overhead storage bin 102' may be measured between a panel plane 68 passing through first panel 42' of overhead storage bin 102' and a horizontal plane 70 that is parallel to the floor on the interior of passenger compartment 18 of aircraft 10, where each of the planes 68, 70 intersects a point 72 corresponding to the lowest point of bin 102 when in the closed position (e.g., point 72 may be the point of bin 102 that is closest to the floor of aircraft passenger compartment 18). For example, plane 68, corresponding to bin 102' being in the initial open position, may form a first angle 74 between plane 68 and horizontal plane 70. Plane 68', corresponding to bin 102" being in the second open position may form a second angle 76 between plane 68' and horizontal plane 70. Second angle 76 may have a greater absolute value than first angle 74, representing that bin 102" is open further downwards in the second open position than bin 102' is open in the initial open position. In some examples, first angle 74 may be approximately zero degrees, such as in examples where first panel 42' is approximately parallel to the floor of passenger compartment 18 in the initial open position.

Figure 8:
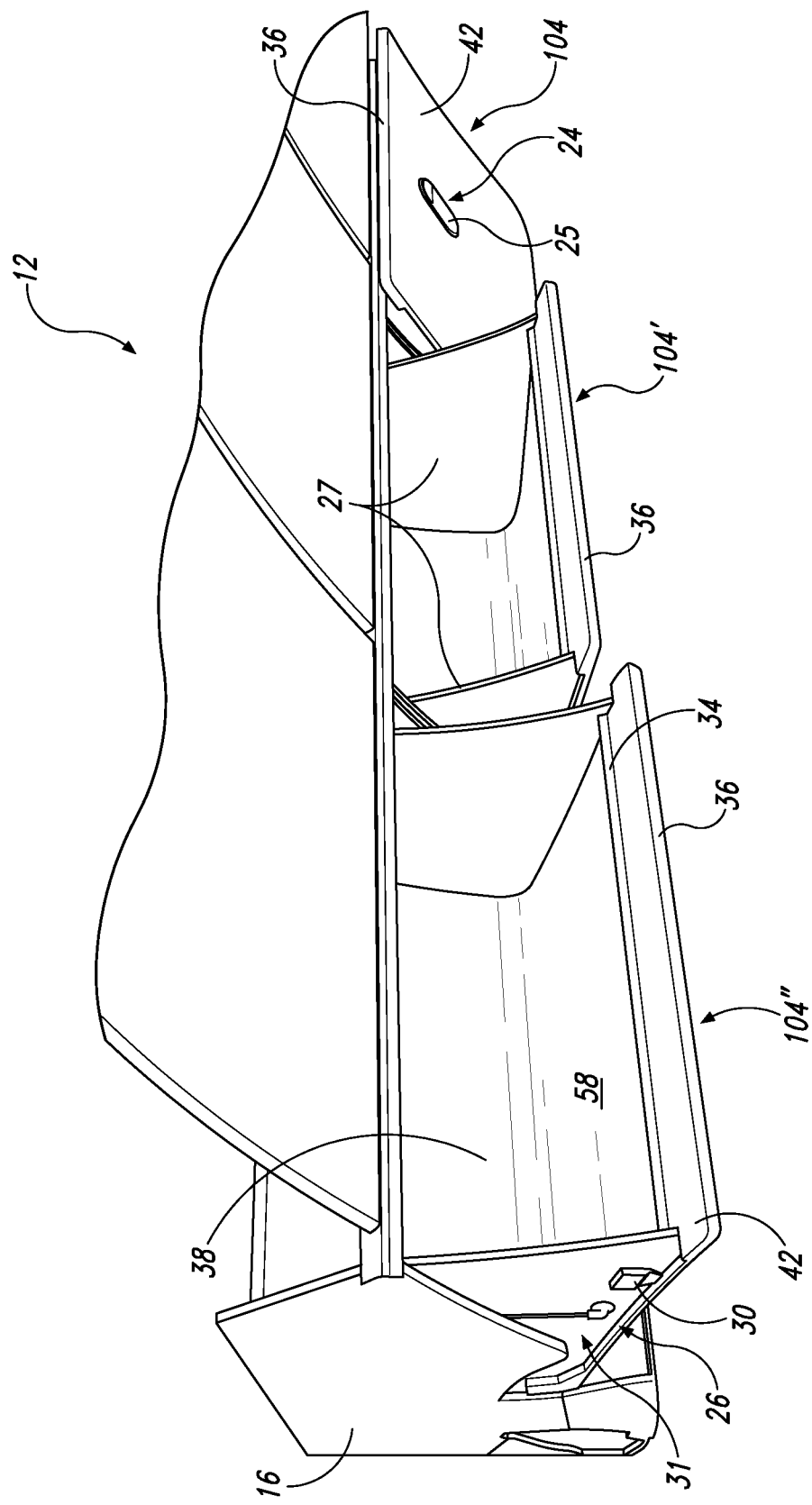
FIG. 8 is a perspective view of three overhead storage bins according to the present disclosure, one in a closed position, one in an initial open position, and one in a second open position.

FIG. 8 shows another example of an overhead storage system 12 that may include an overhead support structure 16 and a variable opening overhead storage bin 104, which is an example of overhead storage bin 14. FIG. 8 illustrates overhead storage bin 104 in a closed position, overhead storage bin 104' in an initial open position, and overhead storage bin 104" in a second open position, showing that bin 104' may be selectively moveable such that it is further pivotable away from overhead support structure 16 beyond the initial open position of bin 104'. A number of article retention features 44 may be included in overhead storage bin 104. For example, inner surface 58 of first panel 42 may include a raised portion, such as a raised portion adjacent groove 34 and/or wedge 38 that may be positioned inside cavity 46 and configured to receive a wheeled portion of a load and reduce motion of the wheeled portion, which may thereby increase article retention within bin 104. Additional or alternative article retention features 44 may also be provided.

Figure 9:
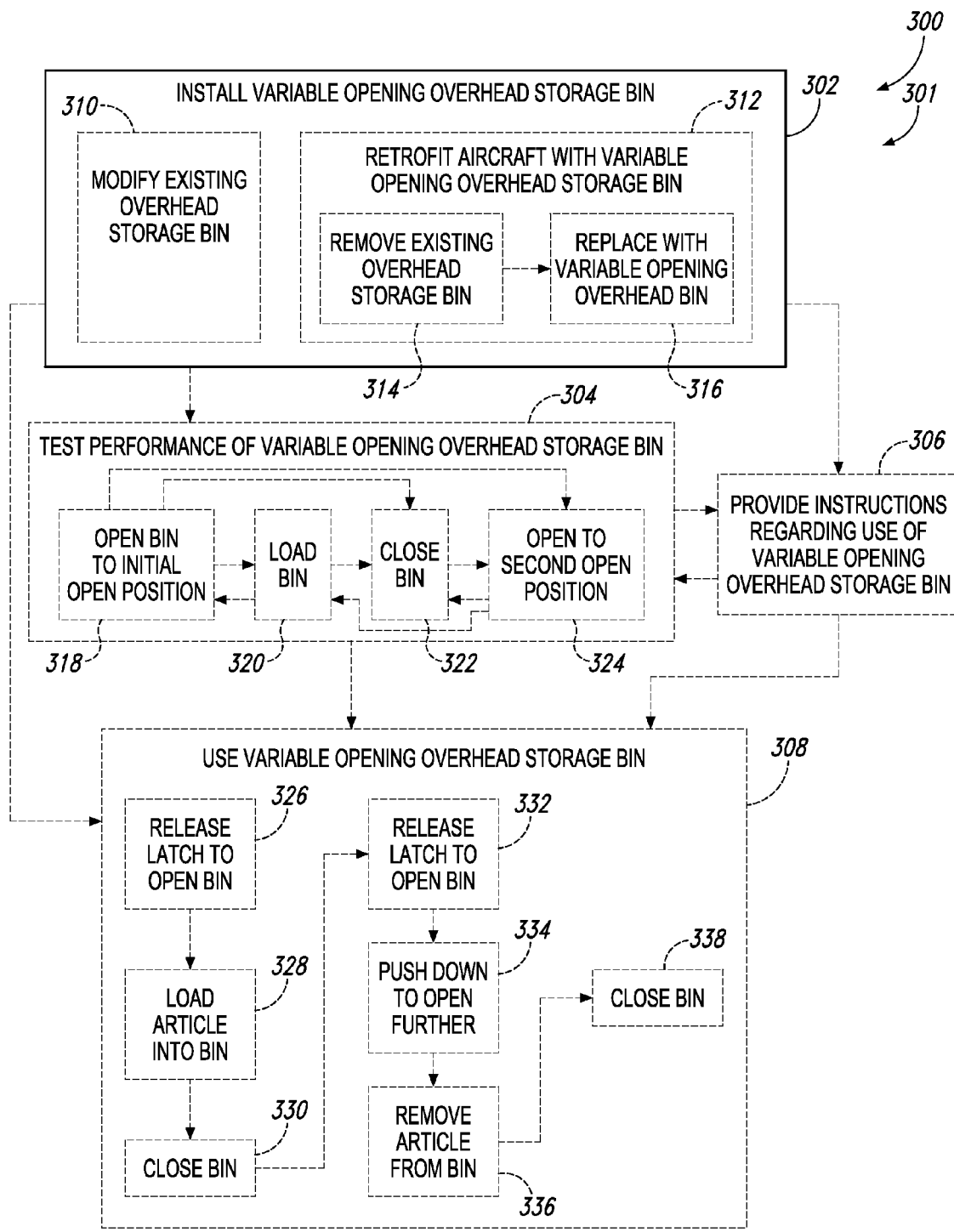
FIG. 9 is a schematic flow diagram representing methods according to the present disclosure.

FIG. 9 schematically provides a flowchart that represents illustrative, non-exclusive examples of methods according to the present disclosure. In FIG. 9, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein.

As seen in FIG. 9, methods for providing a variable opening overhead storage bin 300 may include methods for improving article retention 301. Such methods 300, 301 may include installing a variable opening overhead storage bin according to the present disclosure (e.g., variable opening overhead storage bin 14) at 302, testing performance of the variable opening overhead storage bin at 304, providing instructions regarding use of the variable opening overhead storage bin at 306, and/or using the variable opening overhead storage bin at 308.

Installing the variable opening overhead storage bin at 302 may include installing one variable opening overhead storage bin on an aircraft, or a plurality of variable opening overhead storage bins on an aircraft. Installing the variable opening overhead storage bin at 302 may also include installing an overhead support structure, so that an overhead storage system is installed at 302. In some methods, installing a variable opening overhead storage bin at 302 may include modifying an existing overhead storage bin and/or overhead support structure on an aircraft at 310. For example, an existing pivot bin on an aircraft may be modified, such as by modifying and/or adding to an existing rate control device or other opening mechanism, in order to transform the existing pivot bin to a variable opening overhead storage bin having functionality according to the present disclosure. One, some, or all of the existing pivot bins may be modified in various methods 300, 301. In some examples, this may include removing one or more components from an existing pivot bin and replacing them with new components. In some examples, modifying an existing bin to make a variable opening overhead storage bin may include simply adding new components to the existing pivot bin. For example, existing rate control devices may be modified to provide the functionality described herein (e.g., a spring or other compressible component may be added to an existing rate control device to allow the pivot bin to be moved from the initial open position to or towards the second open position). In one specific example, a spring component may be added at or near the end of the stroke of an existing rate control device and configured such that exerting a force on the bin extends the spring component, allowing the bin to be further opened. In other examples, existing rate control devices may be removed and replaced with a rate control device according to the present disclosure.

In some methods 300, 301, installing the variable opening overhead storage bin at 302 may include retrofitting an aircraft with a variable opening overhead storage bin at 312. For example, retrofitting an aircraft may include removing one or more existing overhead storage bins of any type at 314, and replacing the old bins with one or more variable opening overhead storage bins according to the present disclosure at 316. One, some, or all of the existing bins may be removed and replaced in various methods 300, 301. The removing the existing bins at 314 may be performed before replacing them with a new variable opening overhead storage bin at 316. In this manner, an existing aircraft may be fitted with one or more variable opening overhead storage bins according to the present disclosure, and article retention may be increased or improved on the aircraft.

In some methods 300, 301, modifying an existing overhead storage bin at 310 and/or retrofitting an aircraft with a variable opening overhead storage bin at 312 may include modifying, removing, and/or replacing the existing overhead support structure on the aircraft, such that the overall overhead storage system (e.g., the overhead storage bins and the overhead support structure) is modified or removed and replaced with an overhead storage system that includes one or more variable opening overhead storage bins. In other methods 300, 301, installing a variable opening overhead storage bin (or overhead storage system including a variable opening overhead storage bin) at 302 may include installing a variable opening overhead storage bin on a new aircraft at the time of manufacture, and therefore may include providing an aircraft that includes one or more variable opening overhead storage bins according to the present disclosure.

Testing the performance of the variable opening overhead storage bin (or overhead storage system including a variable opening overhead storage bin) at 304 may include operating the variable opening overhead storage bin and/or using the bin in order to test its functionality and performance on an aircraft in which the bin is installed. For example, testing at 304 may include opening the bin to the initial open position at 318, loading the bin with an article, piece of luggage, and/or other load at 320, closing the bin at 322, and/or opening the bin to a second open position at 324 (e.g., by applying a force to the bin to open it to the second open position). As part of testing at 304, data may be measured and collected, where such data may be pertaining to, for example, article retention, load-bearing capability of the bin, angles to which the bin may be opened, and/or forces required to open the bin to or towards the second open position. Data may be analyzed and used to verify that the overhead storage system and/or variable opening overhead storage bin are working as desired, and/or to optimize installation and/or functionality of the overhead storage system or variable opening overhead storage bin.

Additionally or alternatively, methods 300, 301 may include providing instructions regarding use of the variable opening overhead storage bin and/or overhead storage system at 306. For example, instructions may include instructions in the form of signage or placards on and/or in the variable opening overhead storage bin and/or overhead storage system, printed or written instructions, printed information cards, and/or verbal instructions. Providing instructions at 306 may include providing specific instructions as to opening the variable opening overhead storage bin further from the initial open position to or towards the second open position.

Use of the variable opening overhead storage bin (or overhead storage system) at 308 may include one or more of a plurality of substeps. For example, disclosed variable opening overhead storage bins and overhead storage systems may be used to stow an article during a flight and allow for retrieval of the article during the flight and/or at the end of the flight. Such steps may include releasing a latch to open the bin at 326, loading an article into the bin at 328, closing the bin at 330. Such steps 326, 328, 330 may, in some methods, be performed before a flight of an aircraft (e.g., while the aircraft is on the ground, while passengers are boarding, etc.). During or after the flight, if it is desired to remove the article or load from the bin, the latch may again be released to open the bin to an initial open position at 332, and a force may be exerted to open the bin further to or towards the second open position at 334. The article may then be removed from the bin at 336, and the bin may be closed at 338.

Illustrative, non-exclusive examples of inventive subject matter according to the present disclosure are described in the following enumerated paragraphs:

A1. An overhead storage system for use in an aircraft, the overhead storage system comprising:

an overhead support structure coupled to an interior of an aircraft fuselage; and an overhead storage bin having a first panel and a cavity configured to receive a load, the overhead storage bin being movably coupled to the overhead support structure such that the overhead storage bin is selectively moveable from a closed position, in which a first edge of the first panel is positioned adjacent the overhead support structure, thereby closing the cavity off from the interior of the aircraft fuselage, to an initial open position in which the first edge of the first panel is spaced apart from the overhead support structure by a first distance and the cavity is open to the interior of the aircraft fuselage via an opening, and wherein the overhead storage bin is further selectively moveable from the initial open position to a second open position, wherein, in the second open position, the first edge of the first panel is spaced apart from the overhead support structure by a second distance, the second distance being greater than the first distance.

A2. The overhead storage system of paragraph A1, wherein the overhead storage bin is configured to be moved substantially vertically away from the overhead support structure when moved from the initial open position to the second open position.

A3. The overhead storage system of any of paragraphs A1-A2, wherein the second distance is at least 1 inch (2.5 cm), at least 2 inches (5 cm), at least 3 inches (7.5 cm), at least 4 inches (10 cm), and/or at least 5 inches (12.5 cm) greater than the first distance.

A4. The overhead storage system of any of paragraphs A1-A3, wherein the first panel includes an inner surface facing the cavity and an outer surface facing the interior of the aircraft fuselage.

A5. The overhead storage system of paragraph A4, wherein the inner surface of the first panel includes at least one article retention feature.

A6. The overhead storage system of any of paragraphs A4-A5, wherein the inner surface of the first panel includes a groove adjacent the first edge, the groove being configured to increase article retention in the overhead storage bin.

A7. The overhead storage system of any of paragraphs A5-A6, wherein the inner surface of the first panel includes a raised portion adjacent an/the article retention feature.

A8. The overhead storage system of any of paragraphs A1-A7, wherein the overhead storage bin includes a wedge stop positioned inside the cavity, the wedge stop being configured to receive a wheeled portion of the load and reduce motion of the wheeled portion.

A9. The overhead storage system of any of paragraphs A1-A8, further comprising a latch mechanism configured to retain the overhead storage bin in the closed position while the overhead storage bin is not being operated.

A10. The overhead storage system of paragraph A9, wherein the latch mechanism includes a handle positioned on the first panel, the handle being accessible from the interior of the aircraft fuselage when the overhead storage bin is in the closed position.

A11. The overhead storage system of paragraph A10, wherein the latch mechanism is configured such that operation of the handle causes the overhead storage bin to open to the initial open position.

A12. The overhead storage system of any of paragraphs A1-A11, wherein the overhead storage bin is configured to automatically stop at the initial open position when the overhead storage bin is opened from the closed position.

A13. The overhead storage system of any of paragraphs A1-A12, wherein the overhead storage bin is configured such that application of a force to the overhead storage bin is required to move the overhead storage bin from the initial open position to the second open position.

A14. The overhead storage system of any of paragraphs A1-A13, wherein the overhead storage bin is configured such that application of a downward force to the overhead storage bin is required to move the overhead storage bin from the initial open position to the second open position.

A15. The overhead storage system of any of paragraphs A1-A14, wherein the overhead storage bin is configured such that application of a downward force to the first panel of the overhead storage bin is required to move the overhead storage bin from the initial open position to the second open position.

A16. The overhead storage system of any of paragraphs A1-A15, wherein the overhead storage bin is configured such that the second stop position is the furthest that the overhead storage bin may be opened without damaging the overhead storage system.

A17. The overhead storage system of any of paragraphs A1-A16, wherein the overhead storage bin is configured such that exerting a force on the overhead storage bin in the second open position results in substantially no further movement beyond the second open position.

A18. The overhead storage system of any of paragraphs A1-A17, wherein the overhead storage bin is configured such that selectively exerting a downward force on the first panel enables movement of the overhead storage bin from the initial open position to the second open position.

A19. The overhead storage system of paragraph A18, wherein the downward force must be at least 10 pounds, at least 20 pounds, at least 30 pounds, at least 40 pounds, at least 50 pounds, and/or at least 60 pounds to enable movement of the overhead storage bin from the initial open position to the second open position.

A20. The overhead storage system of any of paragraphs A1-A19, further comprising a rate control device configured to control the rate of lowering when the overhead storage bin is selectively moved from the closed position to the initial open position.

A21. The overhead storage system of paragraph A20, wherein the rate control device comprises a shock absorbing device.

A22. The overhead storage system of any of paragraphs A20-A21, wherein the rate control device comprises a snubber.

A23. The overhead storage system of any of paragraphs A20-A22, wherein the rate control device comprises a spring.

A24. The overhead storage system of paragraph A23, wherein the spring is a gas spring.

A25. The overhead storage system of any of paragraphs A20-A24, wherein the rate control device comprises a snubber configured to control the rate of lowering when the overhead storage bin is lowered from the closed position to the initial open position, the snubber being configured to retain the overhead storage bin in the initial open position in the absence of an external force exerted on the first panel of the overhead storage bin, and wherein the snubber comprises a spring configured to allow selective movement of the overhead storage bin from the initial open position to the second open position in the presence of an external force exerted on the first panel of the overhead storage bin.

A26. The overhead storage system of paragraph A25, wherein the spring is positioned near the end of the stroke of the snubber.

A27. The overhead storage system of any of paragraphs A20-A26, wherein the rate control device comprises a damping device.

A27.1. The overhead storage system of any of paragraphs A20-A27, wherein the rate control device is configured to slow the rate of lowering of the overhead storage bin to a first rate as the overhead storage bin moves from the closed position towards the initial open position, and wherein the rate control device is configured to further slow the rate of lowering of the overhead storage bin to a second rate as the overhead storage bin approaches the initial open position.

A28. The overhead storage system of any of paragraphs A1-A27.1, wherein the overhead storage bin comprises an initial stop device configured to stop the overhead storage bin at the initial open position when it is selectively moved from the closed position towards the initial open position.

A29. The overhead storage system of paragraph A28, wherein the initial stop device is coupled to the overhead storage bin and the overhead support structure.

A30. The overhead storage system of any of paragraphs A1-A29, wherein the overhead storage bin comprises a secondary stop device configured to stop the overhead storage bin at the second open position when it is selectively moved from the initial open position towards the second open position.

A31. The overhead storage system of paragraph A30, wherein the second stop device is coupled to the overhead storage bin and the overhead support structure.

A32. The overhead storage system of any of paragraphs A4-A31, wherein, in the initial open position, the first panel forms a first angle with a horizontal plane that is parallel to a floor in the interior of the aircraft fuselage, and wherein, in the second open position, the first panel forms a second angle with the horizontal plane, the first angle and the second angle being measured between the horizontal plane and the inner surface of the first panel.

A33. The overhead storage system of any of paragraphs A1-A32, wherein the absolute value of the second angle is greater than the absolute value of the first angle.

A34. The overhead storage system of any of paragraphs A1-A33, wherein the first angle is approximately zero degrees.

A35. The overhead storage system of any of paragraphs A1-A34, wherein the first angle has a positive value and the second angle has a negative value.

A36. The overhead storage system of any of paragraphs A1-A35, wherein the overhead storage bin is selectively moveable through a range of pivot positions by pivoting the overhead storage bin from the closed position to the initial open position.

A37. The overhead storage system of paragraph A36, wherein the overhead storage bin is selectively moveable through a second range of pivot positions by further pivoting the overhead storage bin from the initial open position to the second open position, in a direction away from the closed position.

B1. A variable opening overhead storage bin for use in an aircraft, the variable opening overhead storage bin comprising:

a body configured to receive a load via an opening in the body, the body being selectively pivotable with respect to an overhead support structure on the aircraft from a closed position in which the opening is concealed by the overhead support structure to an initial open position in which the opening is accessible such that the load may be placed into and/or removed from the body, wherein the body is further selectively pivotable from the initial open position to a second open position in which the body is further pivoted away from the overhead support structure; and a rate control device configured to control the rate of movement of the body as the body is pivoted from the closed position to the initial open position, the rate control device comprising a stop device that is configured to stop the body at the initial open position and prevent further pivoting of the body until a force is applied to either pivot the body back to the closed position or pivot the body further to the second open position.

B2. The variable opening overhead storage bin of paragraph B1, further comprising a latch positioned on the body, the latch being configured to retain the body in the closed position while the latch is engaged, and the latch being configured to release the body from the overhead support structure when the latch is released, thereby allowing the body to pivot to the initial open position.

B3. The variable opening overhead storage bin of any of paragraphs B1-B2, wherein the rate control device comprises a spring, wherein the spring is configured to bias the body to the initial open position.

B4. The variable opening overhead storage bin of paragraph B3, wherein applying a downward force to the body causes extension of the spring and thereby results in pivoting of the body from the initial open position to the second open position.

B5. The variable opening overhead storage bin of any of paragraphs B1-B4, wherein the body is configured to be selectively pivotable through a range of pivot positions between the closed position and the initial open position, and through a second range of pivot positions between the initial open position and the second open position.

B6. The variable opening overhead storage bin of any of paragraphs B1-B5, wherein the body is configured such that it is not moveable beyond the second open position by further pivoting the body away from the overhead support structure without damaging the body and/or overhead support structure.

B7. The variable opening overhead storage bin of any of paragraphs B1-B6, wherein the rate control device comprises a snubber.

B8. The variable opening overhead storage bin of any of paragraphs B1-B7, wherein the rate control device comprises a gas spring.

B9. The variable opening overhead storage bin of any of paragraphs B1-B8, wherein the rate control device comprises a damping device.

B10. The variable opening overhead storage bin of any of paragraphs B1-B9, wherein the variable opening overhead storage bin is configured to require application of a threshold downward force in order to selectively move the variable opening overhead storage bin from the initial open position to the second open position.

B11. The variable opening overhead storage bin of paragraph B10, wherein the threshold downward force is at least 10 pounds, at least 20 pounds, at least 30 pounds, at least 40 pounds, and/or at least 50 pounds.

B12. The variable opening overhead storage bin of any of paragraphs B1-B11, wherein the body comprises an outer edge, the outer edge being positioned adjacent the overhead support structure in the closed position, and the outer edge being positioned apart from the overhead support structure in the initial open position and the second open position.

B13. The variable opening overhead storage bin of paragraph B12, wherein, in the initial open position, the outer edge is spaced apart from the overhead support structure by a first vertical distance, and wherein, in the second open position, the outer edge is spaced apart from the overhead support structure by a second vertical distance, the second vertical distance being greater than the first vertical distance.

B14. The variable opening overhead storage bin of paragraph B13, wherein the second vertical distance is at least 1 inch (2.5 cm), at least 2 inches (5 cm), at least 3 inches (7.5 cm), at least 4 inches (10 cm), and/or at least 5 inches (12.5 cm) greater than the first vertical distance.

B15. The variable opening overhead storage bin of any of paragraphs B12-B14, wherein the outer edge is configured to receive a downward force that selectively moves the body from the initial open position to the second open position.

B16. The variable opening overhead storage bin of any of paragraphs B1-B15, wherein the size of the opening is greater in the second open position than in the initial open position.

B17. The variable opening overhead storage bin of any of paragraphs B1-B16, wherein the body further comprises an interior cavity configured to receive the load, the interior cavity being accessible via the opening when the body is not in the closed position.

B18. The variable opening overhead storage bin of paragraph B17, wherein the interior cavity comprises at least one article retention feature.

B19. The variable opening overhead storage bin of any of paragraphs B17-B18, wherein the interior cavity comprises a groove formed such that the groove is open to the interior cavity, the groove being configured to increase retention of the load within the body.

B20. The variable opening overhead storage bin of paragraph B19, wherein the groove is a longitudinal groove positioned adjacent an outer edge of the body.

B21. The variable opening overhead storage bin of any of paragraphs B1-B20, wherein the rate control device configured to slow the rate of lowering of the body to a first rate through a first range of positions as the body is selectively caused to pivot from the closed position towards the initial open position, and wherein the rate control device is configured to further slow the rate of lowering of the body to a second rate as the body approaches the initial open position.

C1. An aircraft including a variable opening overhead storage bin according to any of paragraphs B1-B21.

C2. The aircraft of paragraph C1, wherein the aircraft includes a plurality of the variable opening overhead storage bins.

D1. An aircraft including an overhead storage system according to any of paragraphs A1-A37.

E1. A method for increasing article retention on an aircraft, the method comprising:

installing a variable opening overhead storage bin according to any of paragraphs B1-B21 on the aircraft; and testing performance of the variable opening overhead storage bin.

E2. The method of paragraph E1, further comprising providing instructions regarding use of the variable opening overhead storage bin.

E3. The method of any of paragraphs E1-E2, wherein the installing the variable opening overhead storage bin comprises modifying an existing overhead storage bin on the aircraft.

E4. The method of any of paragraphs E1-E3, wherein the installing the variable opening overhead storage bin comprises retrofitting the aircraft with the variable opening overhead storage bin.

E5. The method of paragraph E4, wherein the retrofitting includes removing an existing overhead storage bin from the aircraft before the installing of the variable opening overhead storage bin.

E6. The method of any of paragraphs E1-E5, wherein the installing the variable opening overhead storage bin comprises installing a plurality of variable opening overhead storage bins.

E7. The method of any of paragraphs E1-E6, wherein the testing performance of the variable opening overhead storage bin comprises closing the variable opening overhead storage bin, opening the variable opening overhead storage bin to the initial open position, and opening the variable opening overhead storage bin to the second open position.

F1. A method for increasing article retention on an aircraft, the method comprising:

installing an overhead storage system according to any of paragraphs A1-A37 on the aircraft; and testing performance of the overhead storage system.

F2. The method of paragraph F1, further comprising providing instructions regarding use of the overhead storage system.

F3. The method of any of paragraphs F1-F2, wherein the installing the overhead storage system comprises modifying an existing overhead storage system on the aircraft.

F4. The method of any of paragraphs F1-F3, wherein the installing the overhead storage system comprises retrofitting the aircraft with the overhead storage system.

F5. The method of paragraph F4, wherein the retrofitting includes removing an existing overhead storage system from the aircraft before the installing of the overhead storage system.

F6. The method of any of paragraphs F1-F5, wherein the testing performance of the overhead storage system comprises closing the overhead storage bin, opening the overhead storage bin to the initial open position, and opening the overhead storage bin to the second open position.

G1. Use of a variable opening overhead storage bin according to any of paragraphs B1-1321 to provide storage space for a load during a flight on an aircraft including at least one of the variable opening overhead storage bins.

H1. Use of an overhead storage system according to any of paragraphs A1-A37 to provide storage space for a load during a flight on an aircraft including the overhead storage system.

I1. A method for providing a variable opening overhead storage bin, the method comprising:

providing the variable opening overhead storage bin, wherein the variable opening overhead storage bin is the variable opening overhead storage bin of any of paragraphs B1-B21.

I2. The method of paragraph 11, further comprising performing any of the methods of paragraphs E1-E7.

J1. A method for providing an overhead storage system, the method comprising:

providing the overhead storage system, wherein the overhead storage system is the overhead storage system of any of paragraphs A1-A37.

J2. The method of paragraph J1, further comprising performing any of the methods of paragraphs F1-F6.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An overhead storage system for use in an aircraft, the overhead storage system comprising:

an overhead support structure coupled to an interior of an aircraft fuselage;

an overhead storage bin movably coupled to the overhead support structure such that the overhead storage bin is selectively moveable from a closed position to an initial open position and further selectively moveable from the initial open position to a second open position, the overhead storage bin, comprising:

a first panel;

a side panel coupled to the first panel;

a cavity configured to receive a load, the cavity being at least partially defined by the first panel and the side panel;

a first stop device coupled to the side panel and configured to stop the overhead storage bin at the initial open position until the overhead storage bin is selectively moved to the second open position; and a second stop device coupled to the side panel and configured to stop the overhead storage bin at the second open position, wherein the first stop device and the second stop device are coupled to the overhead storage bin such that the first stop device and the second stop device move with the overhead storage bin as the overhead storage bin is selectively moved from the closed position to the initial open position and the second open position, wherein, in the closed position, a first edge of the first panel is positioned adjacent the overhead support structure, thereby closing the cavity off from the interior of the aircraft fuselage, wherein, in the initial open position, the first edge of the first panel is spaced apart from the overhead support structure by a first distance and the cavity is open to the interior of the aircraft fuselage via an opening, and wherein, in the second open position, the first edge of the first panel is spaced apart from the overhead support structure by a second distance, the second distance being greater than the first distance, wherein the overhead storage bin is configured such that application of a force to the overhead storage bin is required to move the overhead storage bin from the initial open position to the second open position, wherein the overhead storage bin is configured to automatically stop at the initial open position when the overhead storage bin is opened from the closed position, and wherein the overhead storage bin is biased such that the overhead storage bin automatically returns to the initial open position from the second open position when the force that is required to move the overhead storage bin to the second open position is removed; and a rate control device configured to control a rate of lowering when the overhead storage bin is selectively moved from the closed position to the initial open position.

2. The overhead storage system according to claim 1, further comprising a latch mechanism configured to retain the overhead storage bin in the closed position while the overhead storage bin is not being operated, wherein release of the latch mechanism is configured to cause the overhead storage bin to open to the initial open position.

3. The overhead storage system according to claim 1, wherein the overhead storage bin is configured such that application of a downward force to the first panel of the overhead storage bin is required to move the overhead storage bin from the initial open position to the second open position.

4. The overhead storage system according to claim 1, wherein the overhead storage bin is configured such that the second open position is the furthest that the overhead storage bin may be opened.

5. The overhead storage system according to claim 1, wherein the first panel comprises a longitudinal groove formed on an inner surface of the first panel and facing the cavity, wherein the longitudinal groove extends substantially along and adjacent the first edge, and wherein the longitudinal groove is configured to receive a portion of the load within the overhead storage bin as the overhead storage bin is moved to the initial open position and to the second open position.

6. The overhead storage system according to claim 5, wherein the inner surface of the first panel further comprises one or more of a raised portion and/or a wedge positioned within the cavity, wherein the one or more of the raised portion and/or the wedge is configured to receive a wheeled portion of the load positioned within the cavity of the overhead storage bin.

7. The overhead storage system according to claim 6, wherein the one or more of the raised portion and/or the wedge is positioned inside the cavity, opposite the first edge of the first panel.

8. The overhead storage system according to claim 1, wherein the rate control device is configured to control the rate of movement of the overhead storage bin such that the overhead storage bin selectively automatically opens at a first rate as the overhead storage bin is moved from the closed position to a threshold position between the closed position and the initial open position, and such that the overhead storage bin opens at a second rate between the threshold position and the initial open position, wherein the second rate is slower than the first rate.

9. The overhead storage system according to claim 8, wherein in the threshold position, the first panel is approximately level to a cabin floor of an aircraft in which the overhead storage system is installed.

10. The overhead storage system according to claim 1, wherein the first stop device contacts the rate control device when the overhead storage bin is in the initial open position.

11. An aircraft comprising the overhead storage system according to claim 1.

12. A variable opening overhead storage bin for use in an aircraft, the variable opening overhead storage bin comprising:

a body configured to receive a load via an opening in the body, the body being selectively pivotable with respect to an overhead support structure on the aircraft from a closed position in which the opening is concealed by the overhead support structure to an initial open position in which the opening is accessible such that the load may be placed into and removed from the body, wherein the body is further selectively pivotable from the initial open position to a second open position in which the body is further pivoted away from the overhead support structure, wherein the body comprises an outer edge, the body being configured such that the outer edge is positioned adjacent the overhead support structure in the closed position, wherein, in the initial open position, the outer edge is spaced apart from the overhead support structure by a first vertical distance, and wherein, in the second open position, the outer edge is spaced apart from the overhead support structure by a second vertical distance, the second vertical distance being greater than the first vertical distance;

a first stop device coupled to the body and configured to stop the variable opening overhead storage bin at the initial open position until the variable opening overhead storage bin is selectively moved to the second open position;

a second stop device coupled to the body and configured to stop the variable opening overhead storage bin at the second open position, wherein the first stop device and the second stop device are coupled to the variable opening overhead storage bin such that the first stop device and the second stop device move with the variable opening overhead storage bin as the variable opening overhead storage bin is selectively moved from the closed position to the initial open position and the second open position;

an article retention feature formed along the outer edge, within the body, and configured to retain the load within the body as the variable opening overhead storage bin is moved to the initial open position; and a rate control device configured to control a rate of movement of the body as the body is pivoted from the closed position to the initial open position.

13. The variable opening overhead storage bin according to claim 12, further comprising a latch positioned on the body, the latch being configured to retain the body in the closed position while the latch is engaged, and the latch being configured to release the body from the overhead support structure when the latch is released, thereby allowing the body to pivot to the initial open position.

14. The variable opening overhead storage bin according to claim 12, wherein the rate control device comprises a spring, wherein the spring is configured to bias the body to the initial open position, wherein the rate control device is configured to slow the rate of movement of the body to a first rate through a first range of positions as the body is selectively caused to pivot from the closed position towards the initial open position, and wherein the rate control device is configured to further slow the rate of movement of the body to a second rate as the body approaches the second open position.

15. The variable opening overhead storage bin according to claim 14, wherein applying a downward force to the body causes extension of the spring and pivoting of the body from the initial open position to the second open position.

16. The variable opening overhead storage bin according to claim 12, wherein the article retention feature comprises a longitudinally extending groove formed along the length of the outer edge.

17. A method for retaining a load on an aircraft, the method comprising:

installing a variable opening overhead storage bin on the aircraft, the variable opening overhead storage bin comprising:

a body configured to receive the load via an opening in the body, the body being selectively pivotable with respect to an overhead support structure on the aircraft from a closed position in which the opening is concealed by the overhead support structure to an initial open position in which the opening is accessible such that the load may be placed into and removed from the body, wherein the body is further selectively pivotable from the initial open position to a second open position in which the body is further pivoted away from the overhead support structure, wherein the body comprises an outer edge, the body being configured such that the outer edge is positioned adjacent the overhead support structure in the closed position, wherein, in the initial open position, the outer edge is spaced apart from the overhead support structure by a first vertical distance, and wherein, in the second open position, the outer edge is spaced apart from the overhead support structure by a second vertical distance, the second vertical distance being greater than the first vertical distance;

a first stop device coupled to the body and configured to stop the variable opening overhead storage bin at the initial open position until the variable opening overhead storage bin is selectively moved to the second open position;

a second stop device coupled to the body and configured to stop the variable opening overhead storage bin at the second open position, wherein the first stop device and the second stop device are coupled to the variable opening overhead storage bin such that the first stop device and the second stop device move with the variable opening overhead storage bin as the variable opening overhead storage bin is selectively moved from the closed position to the initial open position and the second open position;

an article retention feature formed along the outer edge, within the body, and configured to retain the load within the body as the variable opening overhead storage bin is moved to the initial open position; and a rate control device configured to control a rate of movement of the body as the body is pivoted from the closed position to the initial open position;

opening the variable opening overhead storage bin to the initial open position; and applying a force to the variable opening overhead storage bin to open the variable opening overhead storage bin to the second open position.

18. The method according to claim 17, further comprising testing performance of the variable opening overhead storage bin.

19. The method according to claim 17, wherein the installing the variable opening overhead storage bin comprises modifying an existing overhead storage bin on the aircraft.

20. The method according to claim 17, wherein the installing the variable opening overhead storage bin comprises retrofitting the aircraft with the variable opening overhead storage bin.

* * * * *